United States Patent [19]
Peterson

[11] Patent Number: 4,636,674
[45] Date of Patent: Jan. 13, 1987

[54] LINEAR FLUX SWITCH ALTERNATOR

[75] Inventor: Arnold D. Peterson, Bainbridge, N.Y.

[73] Assignee: Allied Corporation, Morristown, N.J.

[21] Appl. No.: 756,897

[22] Filed: Jul. 19, 1985

[51] Int. Cl.[4] ............................................. H02K 21/38
[52] U.S. Cl. .................................... 310/155; 310/168; 310/111
[58] Field of Search ..................... 310/155, 168, 15, 11

[56] References Cited
U.S. PATENT DOCUMENTS 3,961,214  6/1976  Lokkart ................................ 310/155
4,528,471  7/1985  Baumann ......................... 310/168 X Primary Examiner—Donovan F. Duggan
Attorney, Agent, or Firm—Bruce L. Lamb; Robert M. Trepp

[57] ABSTRACT

A stator adapted for mounting adjacent the periphery of a moving machine gear, whereby the gear serves as a rotor in an electric alternator. A pair of elongated pole pieces are mounted in parallel adjacent the gear periphery. Dependent teeth are formed on each of the ends of each pole piece. The ends of the teeth of the pole pieces are separated from the gear tooth tips by a short air gap. The pole pieces are of length such that when the teeth at one end of a pole piece overlie gear tooth tips, the teeth at the opposite end of that pole piece overlie spaces between gear teeth. The pole pieces are displaced longitudinally relative to one another so that when the teeth at one end of one pole piece overlie gear tooth tips, the teeth at the like end of the other pole piece overlie spaces between gear teeth. Magnets are positioned between the pole pieces, one at each end. Gear motion induces electrical potentials in conductor coils wound on the pole pieces.

14 Claims, 9 Drawing Figures

LINEAR FLUX SWITCH ALTERNATOR

The present invention relates to electric generators. More particularly, it relates to a small capacity alternating current generator excited by permanent magnets.

BACKGROUND OF THE INVENTION

This invention is a type of flux switch alternator. A flux switch alternator, as conventionally constructed, comprises a pair of stationary magnets and a pair of pole pieces joining the like poles of the magnets. The magnets and pole pieces are shaped into a circular stator configuration surrounding a concentrically mounted rotor of high permeability material. An inwardly directed salient member is formed at each end of both pole pieces and the rotor is formed with outwardly directed teeth similar to those of a gear. Conductor coils are wound upon each pole piece between the salient end members thereof. The width of each rotor tooth and the spacing between rotor teeth is substantially equal to the width of a pole piece salient. The teeth are of such height that when a rotor tooth is aligned with a pole piece salient only a very short radial air gap exists therebetween. When a rotor tooth space is aligned with a pole piece salient, a much longer radial air gap exists between the pole piece salient and the rotor body. The pole piece lengths, the width of the pole piece salients, the rotor tooth width and rotor tooth spacing are all so selected that when a rotor tooth underlies the upper salient of one of the pole pieces a different rotor tooth underlies the lower salient on the other pole piece. Simultaneously, the lower salient of the one pole piece and the upper salient of the other pole piece each overlies a different one of the rotor tooth spaces. Rotation of the rotor by an amount equal to one rotor tooth width causes the relationships between salients and rotor teeth and between salients and tooth spacings to be interchanged. Then the upper salient of the one pole piece and the lower salient of the other pole piece rotor overlie tooth spaces, while rotor teeth underlie the lower salient of the one pole piece and the upper salient of the other pole piece.

When the rotor is in the first position described, magnetic flux from one of the magnets will thread the coil on the one pole piece in one direction, while the magnetic flux from the other magnet threads the coil on the other pole piece in the opposite direction. When the rotor is in the second position described, the magnetic sources of the fluxes threading the coils are interchanged between the magnets and the direction of the fluxes through the coils are reversed. These changes in magnetic sources and flux directions through the coils induce alternating potentials in each of the coils.

In the present invention the stator elements of the flux switch alternator described are arranged in a linear configuration. The linear stator arrangement is adapted for mounting adjacent a large ring gear or rack gear which is an integral part of a large prime mover, such as a stationary industrial engine used in a pumping station. The engine gear then serves as the rotor element of the alternator.

A primary advantage of the invention is that it is readily adaptable for retrofit installation in large engines merely by the provision of a suitable mounting bracket near the tooth surface of an existing engine gear.

Another advantage of the invention is that it can be designed to provide sufficient output capacity to power the electronic circuits of an electronic ignition system for the engine to which it is fitted, thereby eliminating the need for a battery and charging system.

Still another advantage of the invention, as compared to rotating electric generators, is that it can be fitted to an engine without the necessity for the provision of a rotary auxiliary drive, such as a belt, gear or shaft coupling system.

BRIEF DESCRIPTION

Briefly, the present invention comprises a pair of pole pieces disposed parallel to one another. A pair of exciting magnets are positioned between the pole pieces at the ends thereof with the like poles of the magnets contacting the same pole piece. Conductor coils are wound on each pole piece along the lengths of the pole pieces intermediate the magnets. One or more tooth-like projections are formed at each end of each pole piece. The structure is dimensioned for mounting in the plane of motion of a large ring gear or rack gear with the pole piece teeth spaced from the gear tooth tips by an air gap of short length. The width of the pole piece teeth and the spacings therebetween correspond to the tooth width and tooth spacing of the associated gear. The intermediate portions of the pole pieces are of each such length that when the teeth at one end of a pole piece each overlie the tips of gear teeth, the teeth at the other end of that pole piece each overlie gear tooth spaces. The pole pieces are displaced longitudinally relative to one another by a distance of one-half of the gear tooth pitch so that when the teeth at one end of one pole piece overlie gear tooth tips, the teeth at the corresponding end of the other pole piece overlie gear tooth spaces. Motion of the gear relative to the pole pieces causes the sources of the magnetic fluxes threading the conductor coils to be interchanged and the directions of such fluxes to be alternately reversed, inducing alternating potentials in the coils in a manner similar to the rotary flux switch alternator.

DETAILED DESCRIPTION

Figure 1:
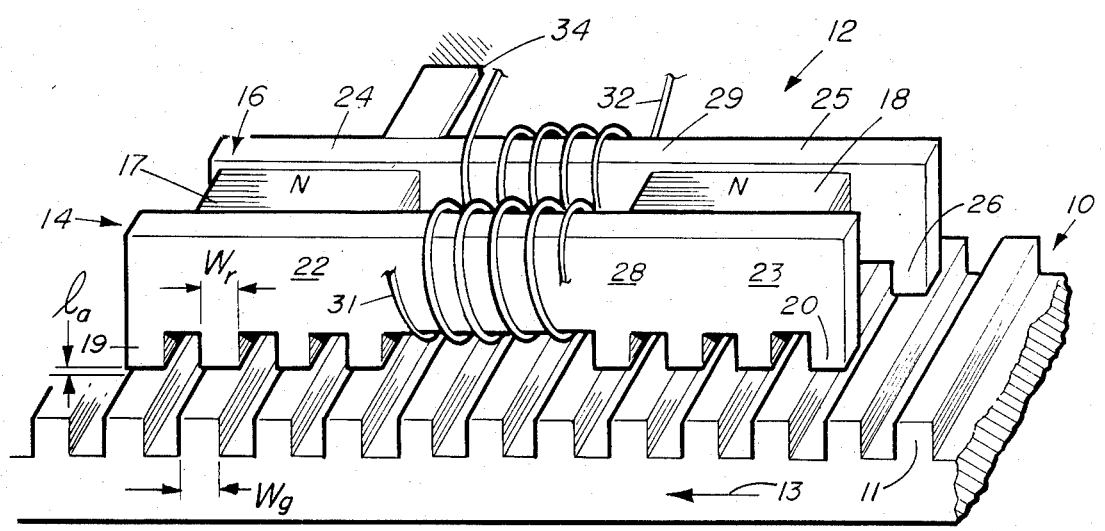
FIG. 1 is an oblique view of the invention.

FIG. 1 is a simplified oblique view of the invention. A large spur gear 10 is shown in developed form. Alternatively gear 10 may be comprised by a rack. Commonly, such a gear appears as a ring gear formed on the flywheel of a stationary engine. Typically, such a gear may be of the order of one meter or more in diameter and have teeth from one to two centimeters in transverse width and from two to three centimeters in axial width. For simplicity of illustration, the gear teeth 11 are shown as having rectangular profiles where, in actuality, the gear tooth profiles would normally be involute. Gear 10 is formed of magnetic material. Gear motion is assumed to be in the direction of arrow 13.

The generator stator 12 comprises a pair of identical pole pieces 14, 16 of magnetic material positioned parallel to one another along the line of motion of gear 10. A pair of permanent magnets 17, 18 are positioned between pole pieces 14, 16 at the ends thereof and in intimate contact therewith. Magnets 17, 18 are magnetized in a direction transverse to the line of motion of gear 10 and the like poles of both magnets are in contact with the same pole piece. As shown, the north poles of magnets 17, 18 are both in contact with pole piece 16, but the direction of magnetization could be reversed with equally satisfactory results.

A like number of dependent teeth, typically 19, 20 are formed along the lower edge at each end portion 22, 23 of pole piece 14. Identical teeth are formed on the end portions 24, 25 of pole piece 16. Only one such tooth 26 is seen in FIG. 1. The width $W_T$ of each pole piece tooth is substantially equal to width $W_g$ at the tip of each gear tooth 11. The spacing of the teeth at both ends of each of the pole pieces 14, 16 is substantially equal to the spacing of the gear teeth 11.

The neck portions 28, 29, respectively, joining the end portions 22, 23 and 24, 25 of pole pieces 14, 16 are of length to span an integral number of gear teeth 11 plus one-half of a gear tooth pitch length. Thus, when the teeth 19 on the end portion 22 of pole piece 14 are each aligned with a tooth of gear 10, the teeth 20 on the end portion 23 of pole piece 14 each overlie a tooth space on gear 10.

As previously stated, pole piece 16 is identical in form to pole piece 14. Pole piece 16 is, however, displaced along the line of motion of gear 10 relative to pole piece 14 a distance equal to one-half of the tooth pitch length of gear 10. Thus, when the teeth 19 at the end portion 22 of pole piece 14 are each aligned with teeth on gear 10, the teeth (not seen in FIG. 1) on the end portion 24 of pole piece 16 each overlie a gear tooth space. At the same time, the teeth at the end portion 25 of pole piece 16 are each aligned with teeth of gear 10. Only tooth 26 is visible in this position in FIG. 1.

Conductor coils 31, 32 are wound on neck portions 28, 29. The potentials induced in coils 31, 32 by gear motion, as will be described shortly, are the sources of electrical power output of the generator. Coils 31, 32 may be connected in series, in parallel or independently to external circuits according to the particular application involved.

The stator assembly 12 is mounted securely to the engine frame by a suitable bracket 34 with the ends of the teeth of both pole pieces separated from the gear tooth tips by an air gap of short length $1_a$.

The changes in the paths of magnetic fluxes from magnets 17, 18 threading coils 31, 32 due to motion of gear 10 are illustrated in FIGS. 2–5, to which reference is now made.

Figure 2A:
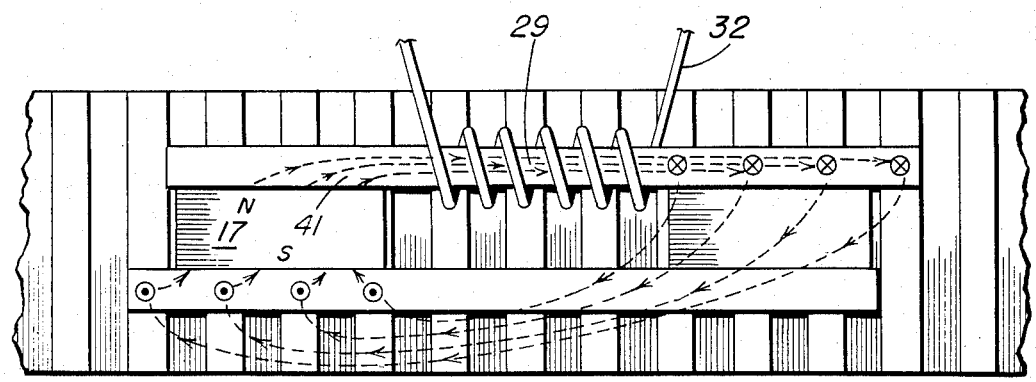
FIG. 2A is a plan view showing the flux paths of magnet 17 for the gear-stator position of FIG. 1.
Figure 2:
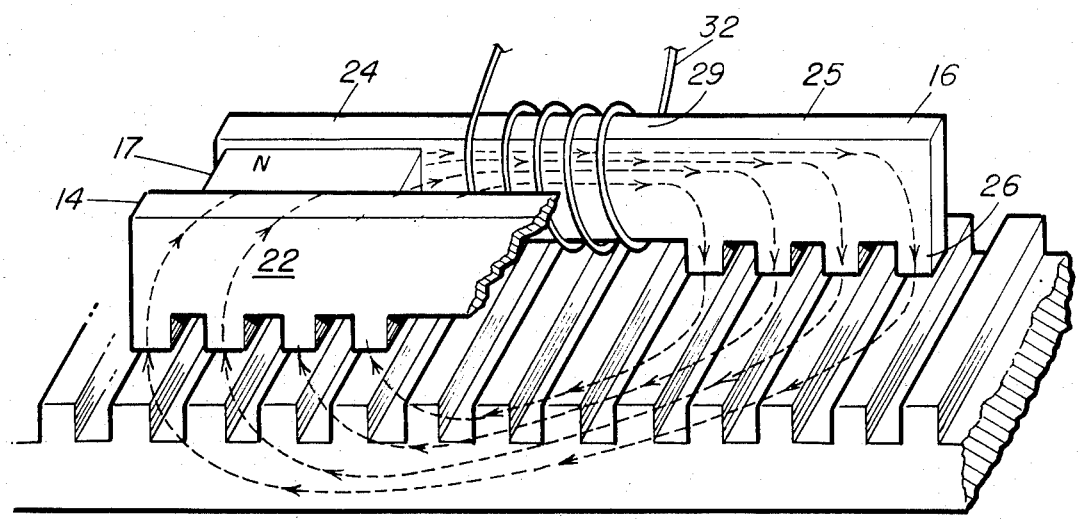
FIG. 2 is an oblique view, similar to FIG. 1 with portions thereof broken away.

The flux paths from magnet 17 for the position of gear 10, relative to stator 12 shown in FIG. 1, are shown in FIGS. 2 and 2A. The magnetic flux originating at the north pole of magnet 17, represented by the lines of force 41, principally follows the path having the lowest reluctance, i.e. the highest permeance, through space to terminate at the south pole of magnet 17. The teeth at the left end portion 24 of pole piece 16 each overlie gear spaces in FIG. 2, resulting in a magnetic path of high reluctance for flux tending to travel from pole piece portion 24 directly downward into gear 10 through the teeth of portion 24. The bulk of the flux from magnet 17 therefor flows through the low reluctance path extending from the north magnet pole, through the neck portion 29 into end portion 25 of pole piece 16. From end portion 25 the flux crosses the narrow air gap between the ends of teeth 26 and the tips of gear teeth 11. The flux then returns to the south pole of magnet 17 through the body of gear 10, crossing the narrow air gap between the gear teeth tips and the overlying teeth on end portion 22 of pole piece 14 and entering the south magnet pole through end portion 22. In following this path the bulk of the flux from magnet 17 threads coil 32, passing from left to right.

Figure 3A:
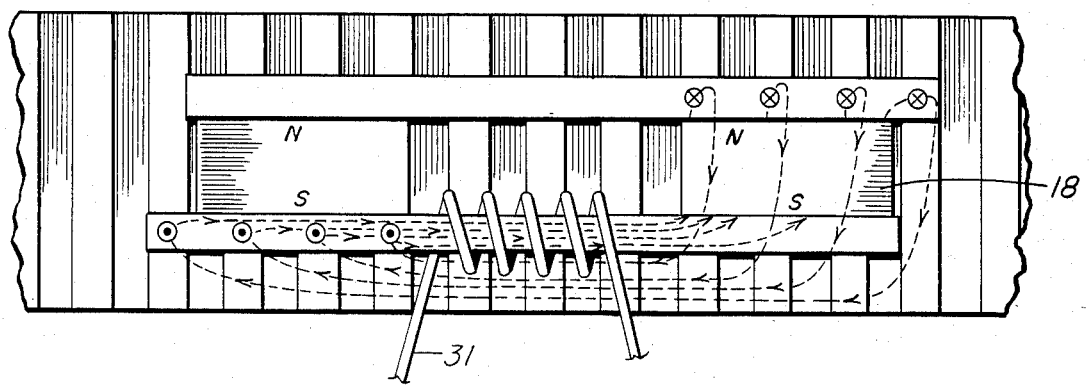
FIG. 3A is a plan view showing the flux paths of magnet 18 for the gear-stator position of FIG. 1.
Figure 3:
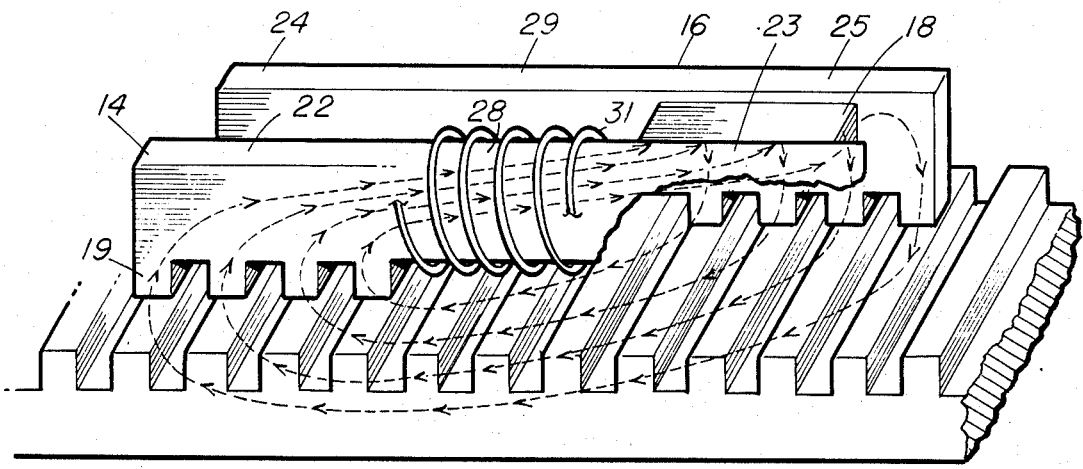
FIG. 3 is an oblique view, similar to FIG. 1 with portions thereof broken away.

The flux paths from magnet 18 for the gear position shown in FIGS. 1 and 2 are shown in FIGS. 3 and 3A. Flux from the north pole of magnet 18 enters the end portion 25 of pole piece 16 with the bulk of the flux flowing directly downward into gear 10 through the teeth of end portion 25. Flux from magnet 18 is deterred from flowing through neck portion 29 and through the teeth on end portion 24 into the body of gear 10 by the high reluctance of the long air gap between the teeth of end portion 24 and the underlying gear tooth spaces. After crossing the short gap between the teeth of end portion 25 and entering the gear body through the aligned gear teeth, the flux flows through the gear body and enters end portion 22 of pole piece 14 through the short air gaps separating the gear tooth tips from the pole piece teeth 19. From end portion 22, the flux flows through neck portion 28 into end portion 23 of pole piece 14 and thence to the south pole of magnet 18. In passing through neck portion 28, flux from magnet 18 threads coil 31, passing from left to right.

For purposes of clarity, the flux paths for magnet 17 have been omitted from FIG. 3, just as the flux paths for magnet 18 were omitted from FIG. 2. It will be understood, however, that fluxes from magnets 17 and 18 are present simultaneously and flow in the same direction through the teeth of pole piece end portions 25 and 22 and the gear body.

Figure 4A:
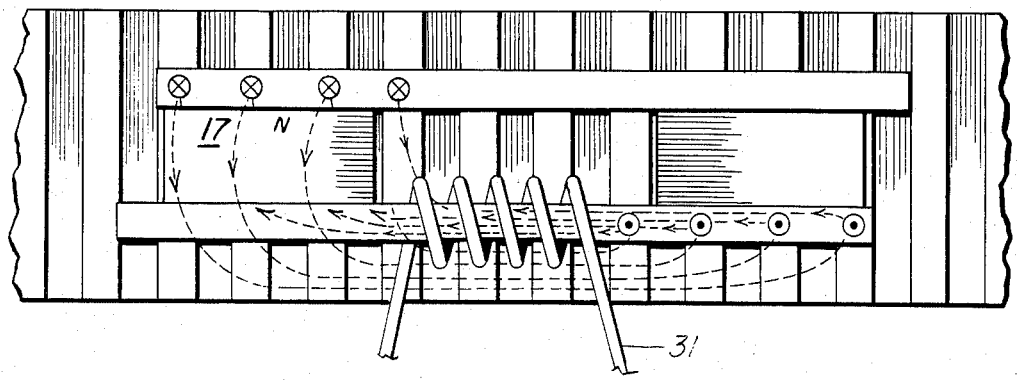
FIG. 4A is a plan view showing the flux paths of magnet 17 for a gear position advanced one-half tooth pitch from the gear-stator position of FIG. 1.
Figure 4:
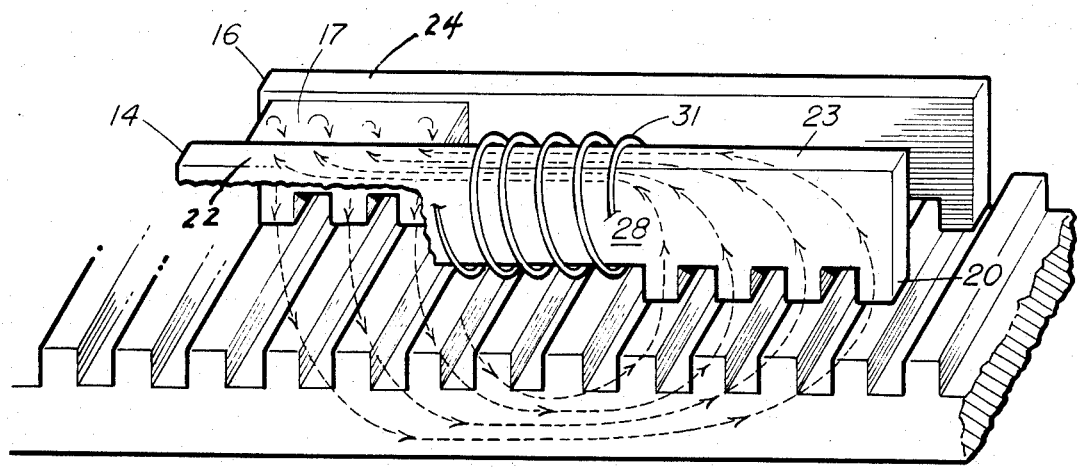
FIG. 4 is an oblique view, with portions broken away.
Figure 5A:
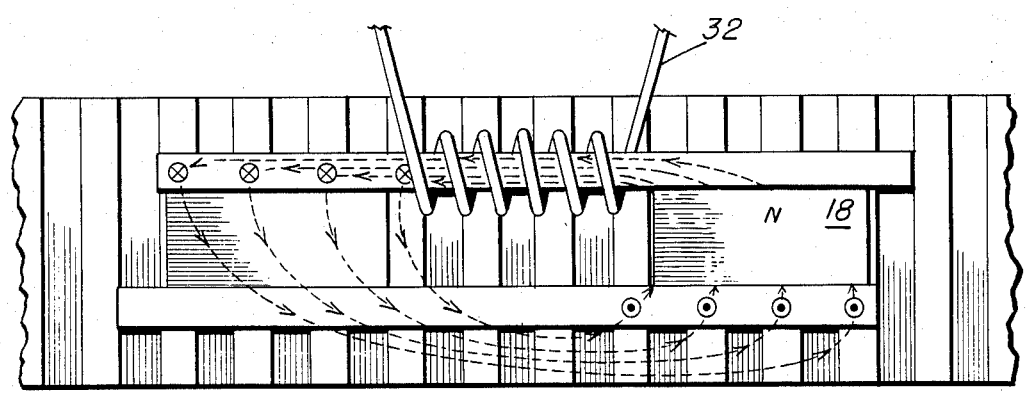
FIG. 5A is a plan view showing the flux paths for magnet 18 for the gear-stator position shown in FIG. 4.
Figure 5:
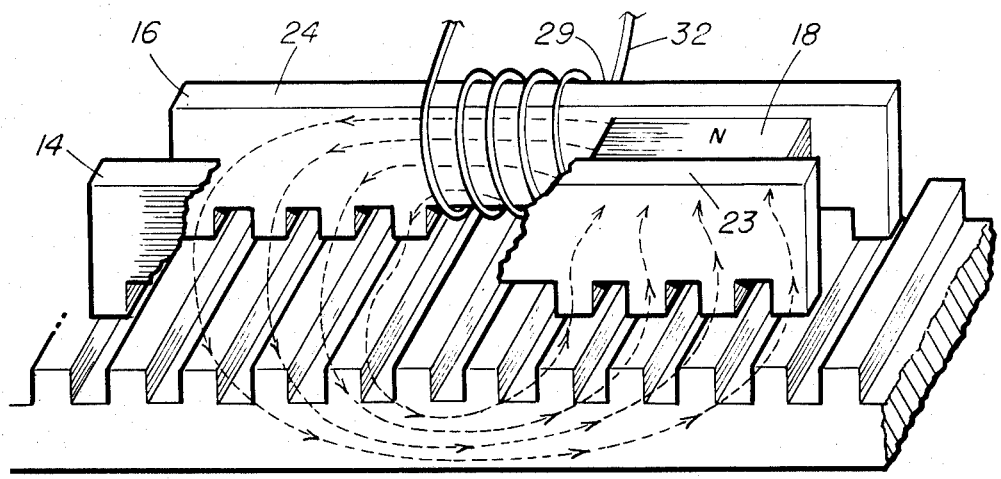
FIG. 5 is an oblique view, with portions broken away.

FIGS. 4 and 5 illustrate the flux paths from magnets 17 and 18 after gear 10 has advanced one-half tooth pitch from the position shown in FIGS. 1, 2 and 3. Referring to FIGS. 4 and 4A, flux from the north pole of magnet 17 passes downward through the teeth of left-hand portion 24 of pole piece 16, which now overlie gear tooth tips, into the gear body. The flux then travels through the gear body and enters pole piece 14 through the teeth 20 on the right-hand portion 23 of pole piece 14 which now overlie gear tooth tips. The flux then travels through neck portion 28 and left-hand portion 22 of pole piece 14 to terminate at the south pole of magnet 17. In traveling through neck portion 28 of pole piece 14, flux from magnet 17 threads coil 31, passing from right to left.

In FIGS. 5 and 5A, gear 10 is in the same position relative to stator 12 as is shown in FIG. 4. Flux from the north pole of magnet 18 travels through the neck portion 29 of pole piece 16 into the left-hand portion 24 thereof. The flux enters the body of gear 10 through the teeth of pole piece portion 24 which now overlie gear tooth tips. Then the flux travels through the gear body towards the right-hand portion 23 of pole piece 14, crosses the narrow air gap between the gear tooth tips and the teeth of portion 23 and travels through portion 23 to terminate at the south pole of magnet 18. In traveling through nect portion 29 of pole piece 16, flux frm magnet 18 threads coil 32, passing from right to left.

By comparing FIGS. 2 and 4, it will be seen that the advancement of the position of gear 10 relative to stator 12 by the distance of one-half gear tooth pitch results in the switching of the flux paths from magnet 17 from a course which threads coil 32 from left to right to a course which threads coil 31 from right to left. By comparing FIGS. 3 and 5, it will be seen that the same change in the gear-stator position shown between FIGS. 2 and 4 results in the switching of the flux paths from magnet 18 from a course which threads coil 31 from left to right to a course which threads coil 32 from right to left. As will be understood, these changes in the magnetic fluxes through the coils induce alternating voltages therein in accordance with the well-known laws of electromagnetic induction.

The invention claimed is:

1. A linear flux switch alternator comprising
   first and second elongated magnetic pole pieces,
   each of said pole pieces having at least one dependent tooth formed transversely to the length of said pole piece at the opposite end portions thereof and having a medial portion joining said end portions;
   means for mounting said pole pieces adjacent the periphery of a moving toothed machine gear with said pole pieces parallel to one another and spaced apart transversely, the length of said pole pieces being aligned with the direction of motion of said machine gear and within the plane of motion of said machine gear, said pole piece teeth being closely spaced from the tips of the teeth of said machine gear;
   a first magnet positioned between the like end portions of said pole pieces, the direction of magnetization of said magnet being transverse to said pole pieces;
   the medial portion of each said pole piece being of such length that when a tooth at one end portion of said pole piece overlies the tip of a tooth on said gear, a tooth on the opposite end of said one pole piece overlies a space between teeth of said gear;
   said pole pieces being displaced longitudinally relative to one another so that when a tooth at one end of one said pole piece overlies the tip of a gear tooth, a tooth at the like end of the other of said pole pieces overlies a space between teeth of said gear; and
   a first conductor coil wound on the medial portion of one of said pole pieces.

2. An alternator as claimed in claim 1 wherein each of said pole pieces is formed with a plurality of dependent teeth at each end thereof, the spacing between teeth at each of said pole piece ends being substantially equal to the spacing between teeth of said gear.

3. An alternator as claimed in claim 1, with additionally, a second magnet positioned between the end portions of said pole pieces opposite said pole piece end portions associated with said first magnet, said second magnet being magnetized in the same direction as said first magnet.

4. An alternator as claimed in claim 3, with additionally, a second conductor coil wound on the medial portion of the other of said pole pieces opposite the one pole piece associated with said first conductor coil.

5. An alternator as claimed in claim 3 wherein said first and second magnets are each permanent magnets.

6. A stator for an electric alternator, said stator cooperating with a moving machine gear, comprising:
   first and second elongated pole pieces of magnetic material disposed parallel to one another and transversely spaced apart;
   first and second magnets positioned between said pole pieces at the opposite ends thereof, said magnets being magnetized transversely to the length of said pole pieces with the like magnetic poles of each magnet contacting the same one of said pole pieces;
   each of said pole pieces having a dependent tooth formed transversely to the length of said pole piece near each end thereof, the spacing between the teeth at the opposite ends of each said pole piece being equal to an integral multiple plus one-half of the tooth pitch of the cooperating machine gear, said pole pieces being displaced longitudinally relative to one another so that when the tooth at one end of one of said pole pieces overlies a tooth on the cooperating machine gear, the tooth at the like end of the other of said pole pieces overlies a tooth space of the cooperating machine gear;
   a conductor coil wound on one of said pole pieces; and
   means for mounting said stator adjacent the periphery of the cooperating machine gear with the lengths of said pole pieces aligned with the direction of motion and within the plane of motion of the cooperating machine gear and with teeth of said pole pieces closely spaced from the tips of the teeth on the cooperating machine gear.

7. A stator as claimed in claim 6 wherein the width of each of said pole piece teeth is substantially equal to the width at the tip of a tooth of the cooperating machine gear.

8. A stator as claimed in claim 6 wherein said first and second magnets are each permanent magnets.

9. A stator as claimed in claim 6 wherein a second conductor coil is wound on the other of said pole pieces.

10. A stator adapted for mounting adjacent the periphery of a toothed machine gear, whereby the machine gear serves as a rotor in an electric alternator, comprising:
    a pair of substantially identical, elongated pole pieces,
    each of said pole pieces having a plurality of dependent teeth formed transversely to the length of said pole piece on the opposite end portions thereof, the end portions of each said pole piece being joined by a neck portion,
    the pitch of said teeth at each of the end portions of said pole pieces being substantially equal to the pitch of the teeth on said machine gear;
    the length of each said neck portion being such as to span an integral number of teeth on the machine gear plus one-half of the pitch length of the machine gear teeth;
    means for mounting said pole pieces parallel to one another and spaced transversely apart adjacent the periphery of the machine gear with the lengths of said pole pieces lying in the plane of motion of the machine gear and aligned with the direction of motion of said machine gear and with said teeth of said pole pieces being closely spaced from the tips of the teeth on the machine gear, said pole pieces being displaced longitudinally relative to one another a distance of one-half of the pitch length of the machine gear teeth;

a first magnet positioned between said pole pieces at one end thereof;

a second magnet positioned between said pole pieces at the ends thereof opposite said first magnet; and a conductive coil wound on said neck portion of one of said pole pieces.

11. A stator as claimed in claim 10 wherein the like poles of said first and second magnets are in contact with the same one of said pole pieces.

12. A stator as claimed in claim 10 wherein the width of each of said dependent teeth on each of said pole pieces is substantially equal to the width at the tips of the teeth on the machine gear.

13. A stator as claimed in claim 10 wherein said first and second magnets are permanent magnets.

14. A stator as claimed in claim 10, with additionally, a second conductive coil wound on the neck portion of the other of said pole pieces.

* * * * *